(12) United States Patent
Burkhardt

(10) Patent No.: US 8,342,137 B1
(45) Date of Patent: Jan. 1, 2013

(54) ANIMAL LEASH

(76) Inventor: Jill Burkhardt, Denver, CO (US)

( * ) Notice: Subject to any disclaimer, the term of this patent is extended or adjusted under 35 U.S.C. 154(b) by 12 days.

(21) Appl. No.: 13/051,818

(22) Filed: Mar. 18, 2011

(51) Int. Cl.
*A01K 27/00* (2006.01)

(52) U.S. Cl. ........................................ 119/792; 119/770

(58) Field of Classification Search ................... 119/770, 119/769, 772, 784, 785, 779, 794, 795, 796, 119/797, 798, 907, 857, 792
See application file for complete search history.

(56) References Cited

U.S. PATENT DOCUMENTS

| | | | | |
|---|---|---|---|---|
| 5,080,045 A | * | 1/1992 | Reese et al. | 119/795 |
| 5,161,486 A | * | 11/1992 | Brown | 119/795 |
| D408,598 S | * | 4/1999 | Martell | D30/153 |
| 5,950,569 A | * | 9/1999 | Perrulli | 119/770 |
| 6,192,835 B1 | * | 2/2001 | Calhoun et al. | 119/792 |
| 6,450,129 B1 | * | 9/2002 | Flynn | 119/770 |
| 6,837,188 B1 | * | 1/2005 | Martin | 119/792 |
| 6,932,027 B1 | * | 8/2005 | Whitney | 119/770 |
| 7,516,717 B2 | * | 4/2009 | David et al. | 119/770 |
| 2004/0194733 A1 | * | 10/2004 | Bremm | 119/770 |
| 2004/0200435 A1 | * | 10/2004 | Debien | 119/772 |
| 2005/0229867 A1 | * | 10/2005 | Green | 119/770 |
| 2010/0089338 A1 | * | 4/2010 | Stern | 119/770 |

\* cited by examiner

*Primary Examiner* — T. Nguyen
(74) *Attorney, Agent, or Firm* — Gulf Coast Intellectual Property Group

(57) ABSTRACT

An animal leash that is operable to be surroundably mounted proximate a user's waist wherein the animal leash is configured to allow the animal tethered thereto to move in a first direction and a second direction. The first direction permitted by the animal is such that the animal can move generally away or towards the user. A second direction is further allowed such that the animal can traverse in a circular direction about the user. The animal leash further includes a belt having a longitudinal track disposed therein. Captively engaged with the track is the wheel assembly, which is configured to traverse along the track. A connections module is secured to the wheel assembly and is intermediate the wheel assembly and the leash container. The connection assembly functions to disengage the leash assembly upon a substantial force being applied thereto. The leash container houses a spring-biased reel, which stores the leash. A plurality of pockets are further included which are integrally formed into the belt.

4 Claims, 2 Drawing Sheets

ANIMAL LEASH

FIELD OF THE INVENTION

The present invention relates to an animal leash, more specifically but not by way of limitation, an animal leash that is surroundably mounted to a user's waist wherein the leash includes a movable portion that allows the animal tethered thereto to encircle the user.

BACKGROUND

Millions of individuals own and care for pets such as but not limited to dogs. Dog owners will routinely involve their dog in a regular exercise program as part of an overall health maintenance program. Many local ordinances require the use of a leash or tether when walking dogs in public areas. Conventional animal leashes typically require the user to maintain a proximate end of the leash in at least one hand in order to control the animal on the distal end so as to limit to distance that the dog can travel in relation to its caretaker.

One problem with conventional dog leashes is that they require the use of a hand to maintain control of the proximate end of the leash. Many dog owners will additionally take the opportunity during walking their dog to engage in a physical activity for themselves such as jogging or running. As these individuals engage in this type of activity while being accompanied by a dog maintaining control of the leash can be cumbersome as often the jogger will need to access an accessory such as but not limited to a water bottle. This task can be more difficult while maintaining the control of the proximate end of the leash.

Another problem that can be encountered during use of a conventional leash is the restricted ability to utilize devices such as cellular phones. Many individuals that are engaged in walking their dog will utilize cellular phone to communicate for business or other reasons. The task of removing a cellular phone from its case and the manipulation thereof can be challenging while attempting to control a dog on a leash with one hand.

Another issue with conventional leashes is the potential risk of injury to the upper body more specifically the shoulder. Those individuals that own larger dogs can be susceptible to injury when the larger dog becomes excited and rapidly runs in a given direction. As the leash is only connected to the user's hand, the rapid departure of a larger dog can cause injury such as hyper-extended elbows or shoulder damage, as the conventional leash does not provide any leverage to control a larger dog.

Accordingly, there is a need for a dog leash that allows the user to control the dog without the need for the use of either hand, and wherein the leash further provides leverage to assist in the control of the dog and includes at least one compartment for an accessory.

SUMMARY OF THE INVENTION

It is the object of the present invention to provide an animal leash that includes a belt that is surroundably mounted to a user's waist so as to provide control of an animal without the use of the user's hands.

Another object of the present invention is to provide an animal leash that facilitates the control of an animal that further allows the animal to traverse in a circular direction around the user.

A further object of the present invention is to provide an animal leash facilitates control of an animal without the requirement of engaging the hands of the user that further includes a track mounted to the belt wherein the proximate end of a leash is mounted thereto.

An additional object of the present invention is to provide an animal leash that facilitates control of an animal during walking the animal without requiring the use of the hands wherein the belt further includes a portion that is designed to provide lower back support.

Still another object of the present invention is to provide an animal leash that allows a user to control a dog without the use of their hands that further includes a plurality of compartments capable of storing accessories for the user.

Another object of the present invention is to provide an animal leash that allows a user to control a dog without the use of their hands wherein the leash is configured with a tension release mechanism operable to release the proximate end of the leash from the belt in the event of the animal departing in a rapid movement.

An additional object of the present invention is to provide an animal leash that facilitates the control of an animal that is comfortable to wear and weather resistant.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
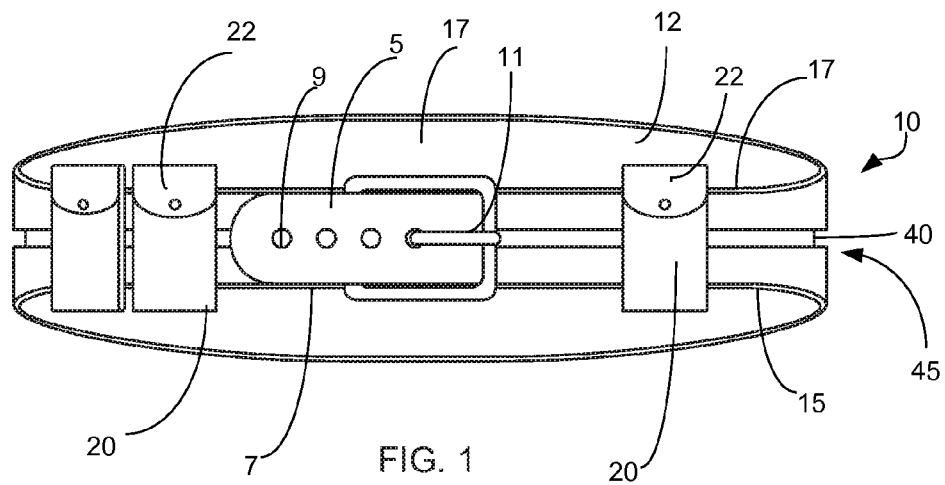
FIG. 1 is a frontal view of the belt portion of the animal leash.

Referring now to the drawings submitted herewith, wherein various elements depicted therein are not necessarily drawn to scale and wherein through the views and figures like elements are referenced with identical reference numerals, there is illustrated a animal leash 100 constructed according to the principles of the present invention.

As illustrated in particular in FIG. 1, the animal leash 100 includes a belt 10 that includes a first end 5 and a second end 7. The first end 5 includes a plurality of apertures 9 that are journaled through the belt 10. Integrally secured to the second end 7 is a conventional buckle having a tongue 11 operable to engage an aperture 9 so as to releasably secure the belt 10 around the user's waist area. The belt 10 includes a body 12 that is manufactured from a durable weatherproof material such as but not limited to a polyester woven recycled fabric. Those skilled in the art should recognize that the body 12 could be manufactured from numerous alternative suitable materials. The belt 10 includes a lower edge 15 and an upper edge 17. The body 12 of the belt 10 is formed such that mid-portion 17 of the body 12 has a greater distance between the lower edge 15 and the upper edge 17 so as to provide additional support for the lower back of the user. The mid-portion 17 of the belt 10 is formed such that the width of the mid-portion 17 gradually transitions towards the first end 5 and the second end 7. Those skilled in the art will recognize that the body 12 of the belt 10 could be formed in numerous different shapes having either consistent or varying widths intermediate the first end 5 and the second end 7.

Integrally formed with the body 12 of the belt 10 are a plurality of pockets 20. The pockets 20 are secured utilizing suitable durable methods to the body 12 and are positioned generally proximate the first end 5 and second end 7. The pockets 20 are manufactured similar to conventional pockets such that the pockets 20 have an interior volume configured to receive and store objects therein. The pockets 20 are configured with a flap 22 that is operable to generally cover the opening of the pocket 20. While three pockets 20 are illustrated in FIG. 1 herein, it is contemplated within the scope of the present invention that any number of pockets 20 could be integrally secured to the belt 10. Additionally, it is further contemplated within the scope of the present invention that the pockets 20 could be configured to be releasably secured to the belt 10 so as to be removed by the user when not desired. Those skilled in the art will recognize that the pockets 20 could be manufactured in a variety of shapes and sizes suitable to receive and store different objects such as but not limited to water bottles, cellular phones and wallets.

Figure 3:
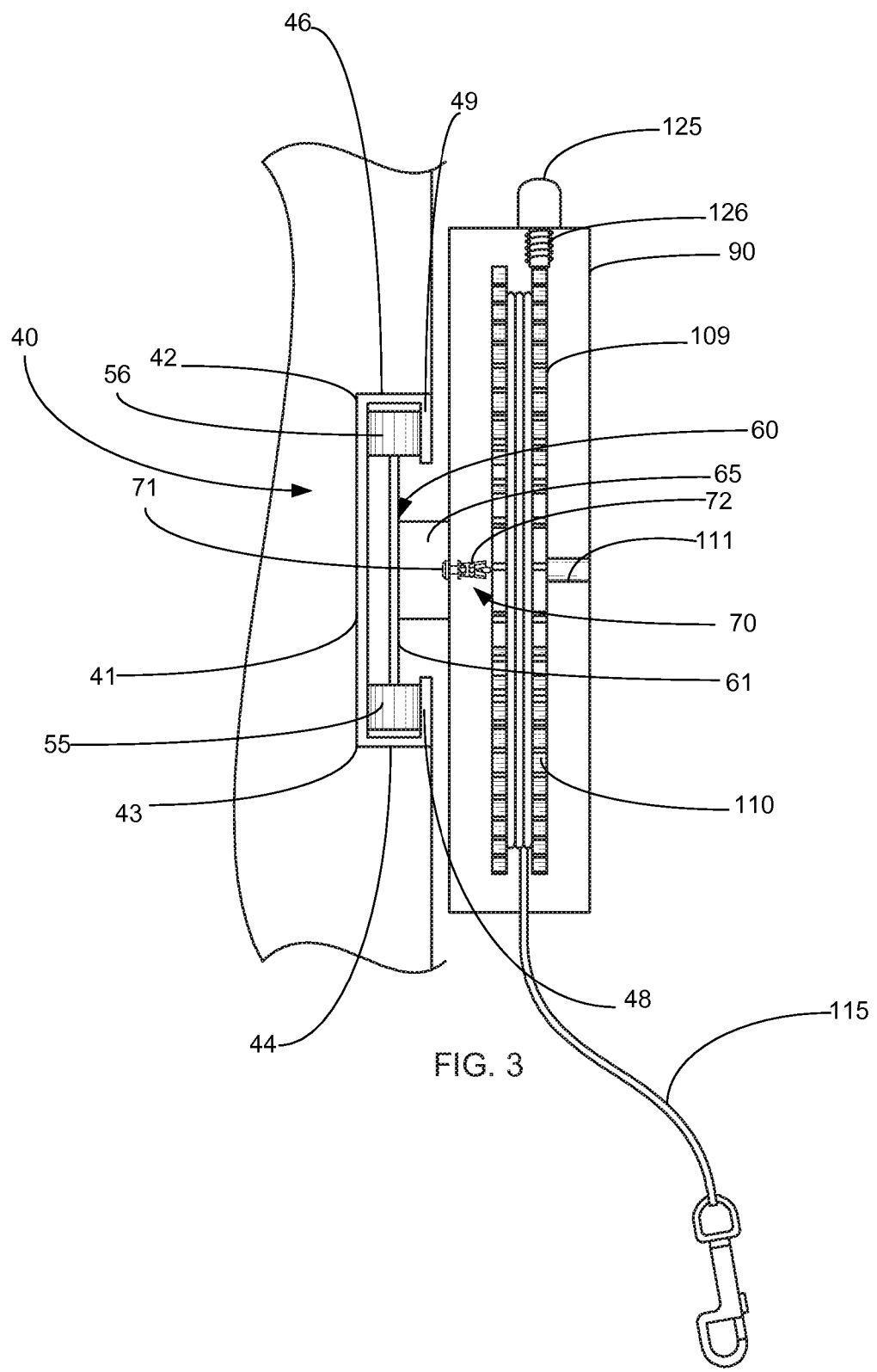
FIG. 3 is a cross-sectional view of the animal leash.

As shown in FIGS. 1 and 3, a track 40 is centrally located in the body 12 of the belt 10. The track 40 generally extends the entire length of the belt 10 from the first end 5 to the second end 7 and is located generally equal distance from the lower edge 15 and upper edge 17 such that the track 40 is mounted in the middle region 45 of the body 12 of the belt 10. The track 40 is manufactured from a suitable durable resilient material such as but not limited to plastic or metal. The track 40 includes a rear support wall 41 that is oriented in a generally vertical manner having a first end 42 and a second end 43. Integrally formed with the first end 42 and the second end 43 are an upper support wall 46 and a lower support wall 44 respectively, the upper support wall 46 and lower support wall 44 are generally perpendicular to the rear support wall 41. A lower forward support wall 48 is integrally formed with the lower support wall opposite the rear support wall 41. The lower forward support wall 48 is oriented in a generally vertical manner being approximately parallel with the rear support wall 41. This configuration facilitates the maintenance of position of the lower wheel 55. The track 40 further includes an upper forward support wall 49 integrally formed with the upper support wall 46 opposite the rear support wall 41. The upper forward support wall 49 extends generally downward from the upper support wall 46 and is generally parallel with the rear support wall 41. This configuration is operable to maintain the upper wheel 56 within the track 41. The track 40 functions to facilitate the traversal of the wheel assembly 60 around the belt 10. The wheel assembly is captively mounted utilizing the upper forward support wall 49 and the lower forward support wall 48. The track 40 further functions to provide additional structural support for the body 12 of the belt 10. While one track 40 is illustrated in the embodiment herein, it is contemplated within the scope of the present invention that the belt 10 may have integrally formed therewith more than one track 40 so as to facilitate the accommodation of more than one animal by the animal leash 100. Additionally, it is further contemplated within the scope of the present invention that the track 40 could be configured in numerous different manners and achieve the desired functionality herein. More specifically but not by way of limitation that belt 10 could have an internal frame wherein the frame includes a portion having ball bearing or similar type movable component so as to facilitate a movable connection between the leash container 90 and the belt 10.

The wheel assembly 60 is movably mounted to the track 40 and facilitates the traversal of the leash container 90 in a circumferential direction around the waist area of the user. The wheel assembly 60 includes an upper wheel 56 and a lower wheel 55 operably coupled with an axle 61. The axle 61 is a conventional axle being generally rod-shaped and manufactured from a suitable durable material such as but not limited to metal. The axle 61 has secured thereto utilizing suitable durable methods a connections module 65. The connections module 65 is generally square in shape being substantially hollow and is manufactured from a suitable durable material such as but not limited to plastic. The connections module 65 functions to releasably secure the leash container 90 to the wheel assembly 60. Operably securing the connections module 65 to the leash container 90 is a conventional tension release mechanism 70. The tension release mechanism 70 has a first portion 71 and a second portion 72, wherein as is know in the art, the second portion 72 will release from the first portion 71 subsequent the presence of a specific amount of force. The utilization of the tension release mechanism 70 functions to protect the user from potential injury in the event that the tethered animal, being walked with the animal leash 100 departs in rapid manner. If the aforementioned situation occurs, first portion 71 and second portion 72 of the tension release mechanism 70 will disengage causing the separation of the leash container 90 from the connections module 65 so as to protect the user from potentially being injured from a rapid movement of the animal. Those skilled in the art will recognize that numerous different types of tension release mechanisms could be utilized in place of and/or in conjunction with the tension release mechanism 70. Additionally, it is contemplated within the scope of the present invention that the tension release mechanism 70 could be calibrated to separate at varying amounts of force so as to accommodate different size animals.

The leash container 90 is releasably secured to the connections module as previously discussed herein. The leash container 90 is generally rectangular in shape and having a plurality of walls 91 forming an interior volume 92. The leash container 90 is manufactured from a suitable durable material such as but not limited to plastic. Those skilled in the art will recognize that the leash container could be manufactured in numerous different shapes and in different sizes. Disposed within the leash container 90 is a reel 110 that is rotatably mounted on a shaft 111. The reel 110 is a conventional reel being structured to accommodate a leash 115 thereon. Although not particularly illustrated herein, the reel 110 is a conventional spring-biased reel that facilitates the coiling of the leash 115 thereon. The reel 110 is rotated in a first direction as the animal coupled to the leash 115 separates from the user. The user can engage the button 125 such that the keeper 126 operably coupled thereto will be moved in a downward direction wherein the keeper 126 engages one of the notches 109 of the reel 110 stopping the rotational movement of the reel 110. The button 125 and keeper 126 are configured such that the keeper 126 can be locked into place so as to maintain the reel 110 is a constant position. As the animal tethered to the leash 115 becomes more proximate the user, the spring-biased reel 110 rotates in a second direction such that the leash 115 is returned to the reel 110. Those skilled in the art will recognize that the leash 115 could be manufactured in numerous different lengths.

Figure 2:
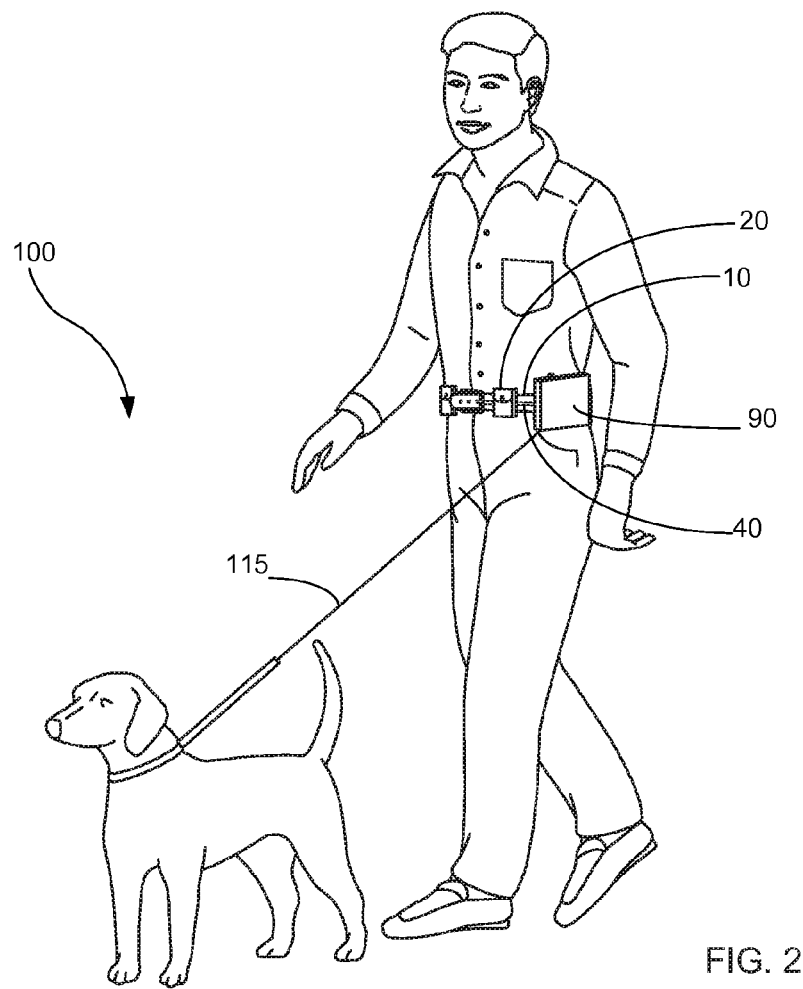
FIG. 2 is a perspective view of the animal leash engaged with a user and having an animal tethered thereto.

Referring in particular to FIGS. 2 and 3, a description of the operation of the animal leash 100 is as follows. In use, the belt 10 of the animal leash 100 is circumferentially secured around the user's waist area. An animal that is desired to be walked by the user is operably coupled to the leash 115. As the user traverses along a path, the animal tethered to the leash 115 can traverse in a first direction that is generally away from the user wherein the spring-biased reel 110 facilitates the deployment of leash 115 required to allow the animal to move away from the user. Additionally, the animal tethered to the leash 115, can move in a second direction, wherein the second direction is such that the animal is moving in generally circular manner around the user. The leash container 90 that is operably coupled to the wheel assembly 60 via the connections module 65 facilitates the circular movement of the animal around the user. As the animal tethered to the leash 115 moves in the second direction, the wheel assembly 60 traverses along the track 40. The animal leash 100 is configured such that the track 40 allows the animal to move approximately three hundred and fifty degrees around the user. If during use the animal tethered to the leash 115 departs in the first direction away from the user in a rapid manner, the leash container 90 will separate from the connections module 65. The tension release mechanism 70 operably coupling the leash container 90 and the connections module 65 functions to separate subsequent the presence of a higher than normal force created by a dog, wherein the force is greater than the force normally exerted on the leash 115 by that particular size of animal.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An animal leash operable to allow a user to guide an animal without the substantial requirement of their hands and wherein the animal leash permits the movement of the animal in a circular manner around the user comprising:

a belt, said belt having a body being generally planar in configuration, said belt having a lower edge and an upper edge, said belt having a first end and a second end, said belt further including a plurality of apertures journaled through said first end, said belt further including a buckle integrally secured to said second end, said belt further including a support area, said support area being opposite said buckle subsequent said belt being secured to a user, said support area being configured such that the distance intermediate said lower edge and said upper edge is greater proximate thereto, said belt operable to be releasably secured to a user proximate the user's waist;

a track, said track being integrally formed with said belt, said track being manufactured from a resilient metal, said track generally extending the length of said belt, said track further including a rear support wall having a first end and a second end, said rear support wall being vertical in manner, said track further including a first and second lateral member, said first lateral member being perpendicular to said rear support wall and secured proximate said first end of said rear support wall, said second lateral support member being perpendicular to said rear support wall and integrally formed with said second end of said rear support wall, said track further including an upper retaining wall and a lower retaining wall, said upper retaining wall integrally formed with said first lateral member opposite said rear support wall, said lower retaining wall being integrally formed with said second lateral support member opposite said rear support wall, wherein said upper retaining wall and said lower retaining wall are parallel with said rear support wall and wherein a void exists intermediate said upper retaining wall and said lower retaining wall;

a wheel assembly, said wheel assembly captively engaged with said track, said wheel assembly configured to traverse along said track so as to allow an animal tethered to the animal leash to move in a circular direction about the user, said wheel assembly further including an upper wheel and a lower wheel, said upper wheel and said lower wheel having an axle therebetween;

a leash container said leash container being secured to said wheel assembly, said leash container containing a retractable cord therein so as to facilitate the movement of the animal tethered to the animal leash in a direction generally away or towards the user; and a connections module, said connections module being intermediate said leash container and said wheel assembly, said connections module being secured to said axle, said connections module further including a tension release mechanism, said tension release mechanism operable to separate said leash container from said wheel assembly.

2. The animal leash as recited in claim 1, wherein said leash container further includes a spring-biased reel, said spring-biased reel disposed within said leash container, said spring-biased reel being rotatably mounted to a shaft.

3. The animal leash as recited in claim 2, wherein said wheel assembly is operable to traverse along said track as an animal tethered to the animal leash moves in a circular direction around the user.

4. The animal leash as recited in claim 3, and further including at least one pocket, said at least one pocket being integral to said belt.

\* \* \* \* \*